US011689269B1

(12) United States Patent
Christopherson et al.

(10) Patent No.: US 11,689,269 B1
(45) Date of Patent: Jun. 27, 2023

(54) SYSTEMS AND METHODS FOR DYNAMIC BEAM SET OPTIMIZATION

(71) Applicant: Verizon Patent and Licensing Inc., Basking Ridge, NJ (US)

(72) Inventors: Corey J. Christopherson, Bainbridge Island, WA (US); Donna L. Polehn, Mercer Island, WA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/661,990

(22) Filed: May 4, 2022

(51) Int. Cl.
*H04B 7/02* (2018.01)
*H04B 7/06* (2006.01)
*H04B 7/0426* (2017.01)
*H04W 64/00* (2009.01)

(52) U.S. Cl.
CPC ......... *H04B 7/0632* (2013.01); *H04B 7/0426* (2013.01); *H04B 7/063* (2013.01); *H04B 7/0695* (2013.01); *H04W 64/00* (2013.01)

(58) Field of Classification Search
CPC .... H04B 7/0632; H04B 7/0426; H04B 7/063; H04B 7/0695; H04W 64/00

USPC ............... 375/267, 262, 261, 219, 295, 316
See application file for complete search history.

(56) References Cited

U.S. PATENT DOCUMENTS

2022/0408446 A1* 12/2022 Zirwas ................. H04W 24/08

* cited by examiner

*Primary Examiner* — Zewdu A Kassa

(57) ABSTRACT

A management system obtains, from a user device, information indicating a power measurement of a beam set that is utilized to communicate with the user device. The beam set includes one or more active beams, of a plurality of beams, that are associated with a single beam identifier. The management system identifies a location of the user device and thereby determines an expected power measurement of the beam set. The management system determines that a difference between the power measurement of the beam set and the expected power measurement of the beam set satisfies (e.g., is greater than or equal to) a difference threshold. The management system therefore causes the beam set to be modified. The management system may use a machine learning model (e.g., a neural network machine learning model) to facilitate modification of the beam set.

20 Claims, 11 Drawing Sheets

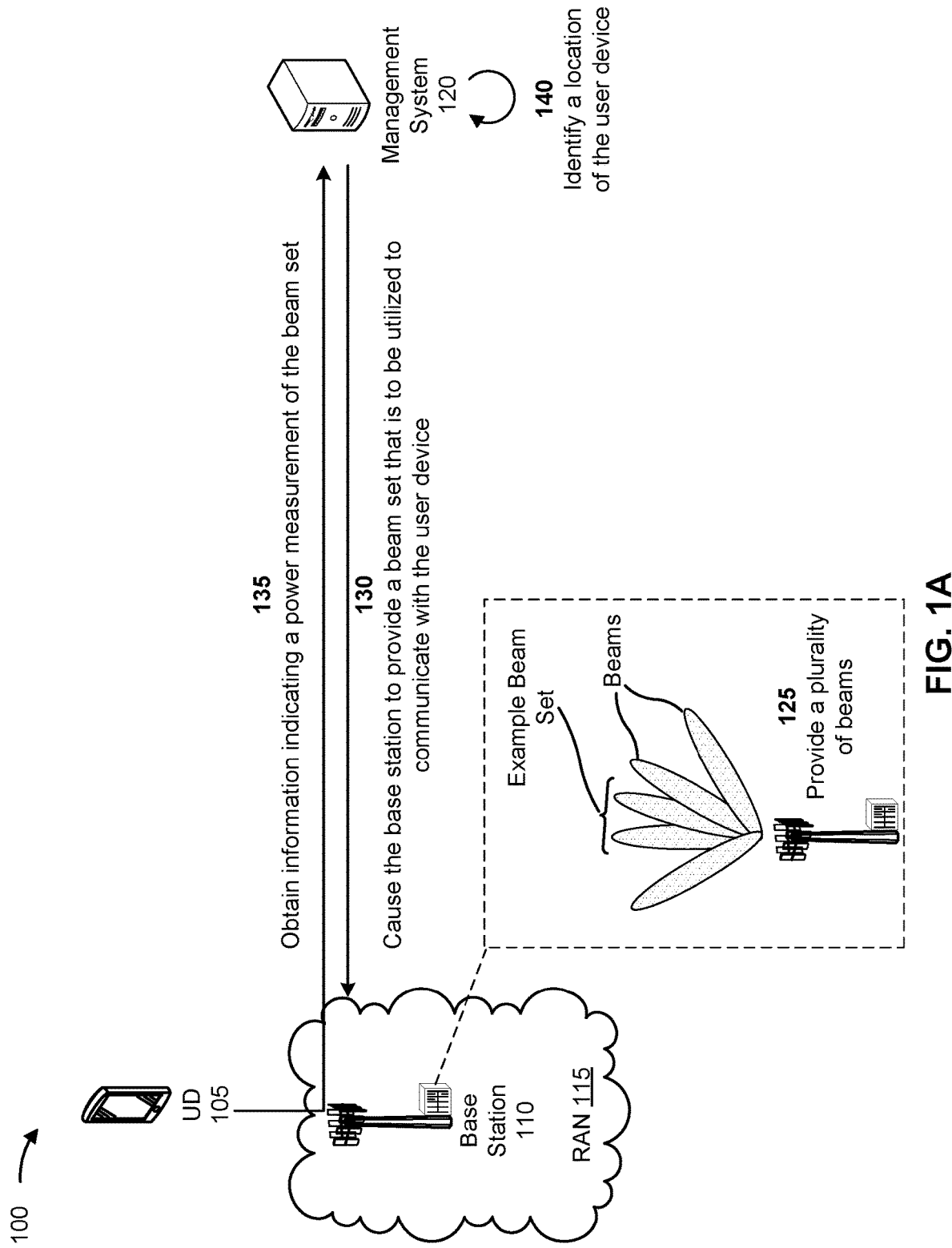

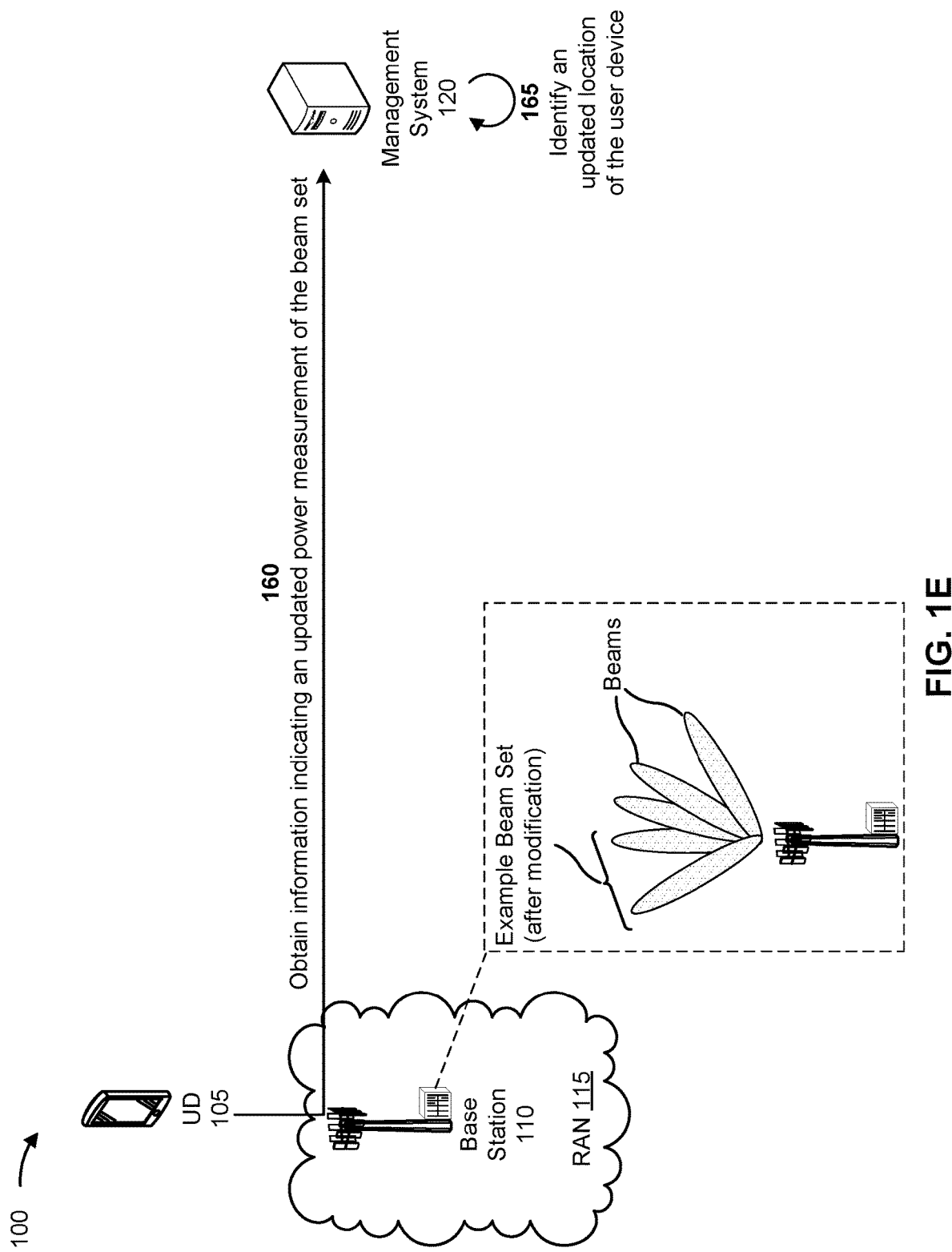

SYSTEMS AND METHODS FOR DYNAMIC BEAM SET OPTIMIZATION

BACKGROUND

Telecommunication networks provide services at ultra-high speeds. In order to provide such ultra-high speeds, the telecommunication networks may utilize technologies such as multiple-input and multiple-output (MIMO) and/or beamforming, among other examples.

BRIEF DESCRIPTION OF THE DRAWINGS

FIGS. 1A-1G are diagrams of an example associated with dynamic beam set optimization.

DETAILED DESCRIPTION OF EXAMPLE EMBODIMENTS

Figure 1B:
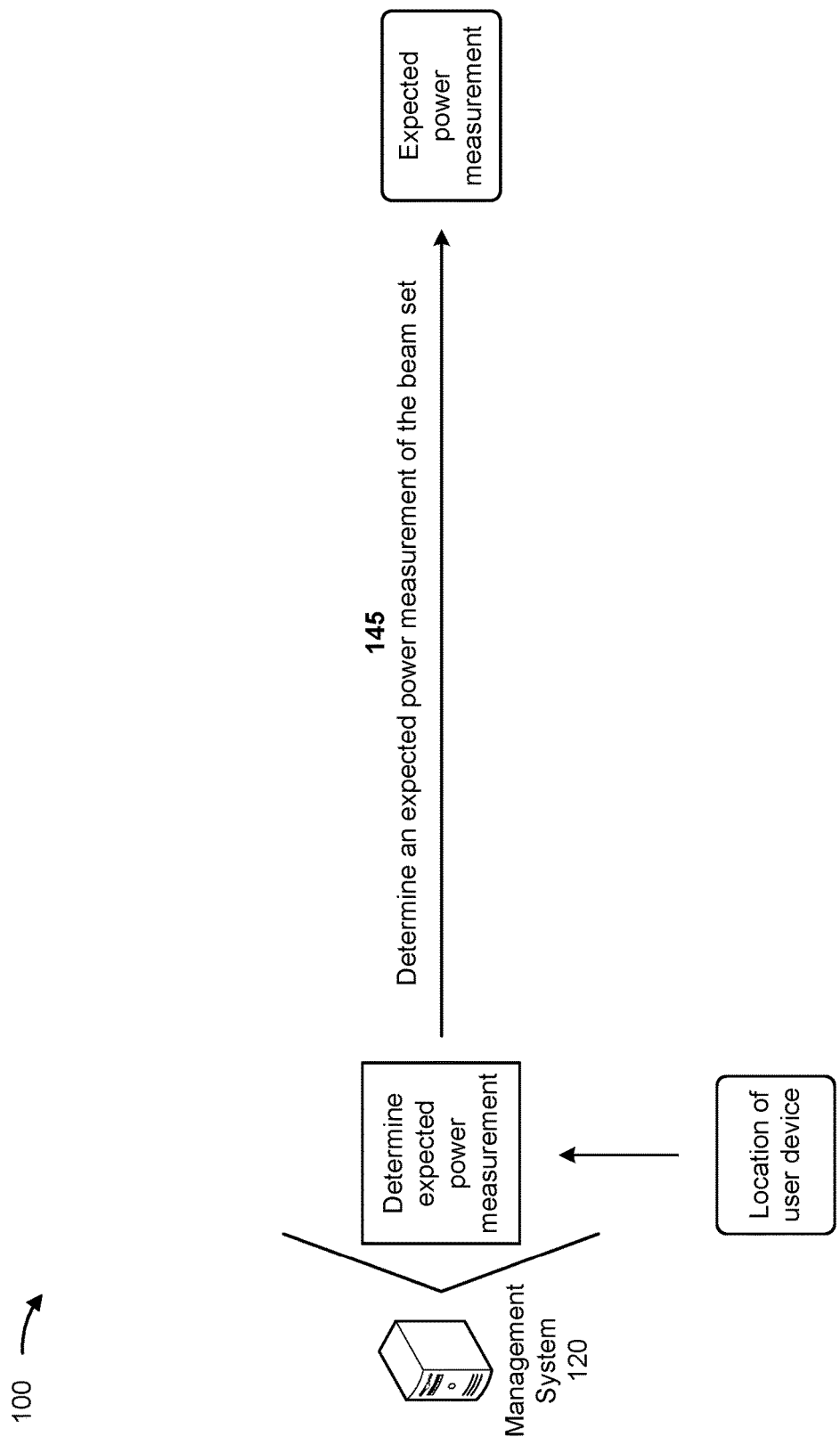

The following detailed description of example implementations refers to the accompanying drawings. The same reference numbers in different drawings may identify the same or similar elements.

A base station, such a as gNodeB (gNB) (or one or more components of or associated with the gNB) that is associated with a radio access network (RAN) of a fifth generation (5G) network, provides a plurality of beams (e.g., a plurality of downlink beams) for communicating with user devices (e.g., to support multiple access and to maximize respective signal-to-interference-plus-noise ratio (SINR) values for the user devices). In many cases, the plurality of beams are fixed (e.g., each beam is configured to provide a coverage to a specific area of a geographical region). A user device therefore selects and utilizes a particular beam (e.g., a beam with a highest power) of a set of beams, of the plurality of beams, that the user device can detect (e.g., with an antenna of the user device) at a location of the user device (e.g., within the geographical region).

However, in some cases, depending on the location of the user device, the particular beam may be partially obstructed (e.g., by a building, by a tree, by foliage, by atmospheric conditions, or other obstructions), which reduces a power of the particular beam (as received by the user device). This is particularly an issue for base stations that provide high-frequency (e.g., millimeter wave (mmWave)) beams, such as for a 5G network, that are very susceptible to fading due to free-space path propagation obstructions. Consequently, a speed, a latency, and other characteristics of communications between the base station and the user device via the particular beam are impacted. This can lead to an increased use of resources, such as radio resources, computing resources (e.g., processing resources, memory resources, communication resources, and/or power resources, among other examples), or other resources, for the base station to increase the power, or other characteristics, of the particular beam to improve one or more characteristics of communications between the base station and the user device via the particular beam. Similar usage of resources is required when the user device is between two adjacent beams of the plurality of beams (e.g., the user device is "in the null," such that the user device is between respective coverage areas of the two adjacent beams) and characteristics of at least one of the two adjacent beams is modified to enable communications with the user device.

Some implementations described herein provide a management system associated with a base station (and a RAN that is associated with the base station). The base station provides a plurality of beams, and the management system causes the base station to provide a beam set (also referred to as a "multipath beam") to a user device. The beam set includes one or more active beams, of the plurality of beams, that are associated with a single beam identifier. That is, each active beam includes the same single beam identifier in communications with the user device, such that the beam set appears, to the user device, as a "single" beam associated with the single beam identifier. Accordingly, the one or more active beams may constructively interfere with each other (via free-space path propagation and/or reflected path propagation) and thereby provide improved speed, latency, and/or other characteristics of communications between the base station and the user device as compared to a single beam, especially when the single beam is at least partially obstructed.

Further, in some implementations described herein, the management system obtains, from the user device, information indicating a power measurement of the beam set (e.g., as received by the user device) and determines an expected power measurement of the beam set (e.g., based on a location of the user device in relation to a location of the base station). The management system determines a difference between the power measurement and the expected power measurement. When the difference does not satisfy (e.g., is less than) a difference threshold (e.g., the power measurement is sufficiently close to the expected power measurement), the management system refrains from causing the beam set to be modified (e.g., to ensure that the beam set continues to be provided to the user device and with an optimal amount of power).

When the difference satisfies (e.g., is greater than or equal to) the difference threshold (e.g., the power measurement is sufficiently less than the expected power measurement), the management system causes the beam set to be modified, such as by adding a beam to the beam set, removing a beam from the beam set, and/or modifying one or more parameters of a beam of the beam set. In some implementations, the management system uses a machine learning model, such as a neural network machine learning model, to facilitate determining how the beam set is to be modified.

After modification of the beam set, the management system obtains, from the user device, information indicating an updated power measurement of the beam set and determines an updated expected power measurement of the beam set. The management system determines a difference between the updated power measurement and the updated expected power measurement. When the difference does not satisfy (e.g., is less than) the difference threshold (e.g., the updated power measurement is sufficiently close to the updated expected power measurement), the management system refrains from causing the beam set to be modified (e.g., to ensure that an optimal amount of power of the beam set is provided to the user device). Alternatively, when the difference satisfies (e.g., is greater than or equal to) the difference threshold (e.g., the updated power measurement is sufficiently less than the updated expected power measurement), the management system causes the beam set to be additionally modified.

In this way, the management system may provide dynamic optimization of the beam set. For example, the management system continually modifies the beam set until a power measurement of the beam set is sufficiently close to an expected power measurement of the beam set. This increases a likelihood that the power of the beam set (as received by the user device) is optimized (e.g., maximized). Accordingly, the beam set provides improved speed, latency, and/or other characteristics of communications between the base station and the user device as compared to a single beam (e.g., that is at least partially obstructed) and as compared to a beam set that is not dynamically optimized (e.g., a static beam set that provides a power measurement that is sufficiently less than an expected power measurement of the static beam set). In this way, the management system improves network coverage and beam reception at the user device.

This results in a reduction in use of resources, such as radio resources, computing resources (e.g., processing resources, memory resources, communication resources, and/or power resources, among other examples), or other resources, that would otherwise be needed for the base station to increase the power, or other characteristics, of a particular beam to be utilized by the user device to improve one or more characteristics of communications between the base station and the user device via the particular beam. Moreover, this results in more efficient allocation of the resources to communicate with the user device, as well as to communicate with other user devices.

While examples described herein are directed to the management system managing a base station associated with a 5G network, implementations include the management system managing any type of base station that provides wireless communications. For example, the management system may cause modification of a beam set provided by a base station associated with a Wi-Fi communication protocol, a Bluetooth communication protocol, and/or other wireless communication protocols, in a same, or similar, manner as elsewhere described herein.

FIGS. 1A-1G are diagrams of an example 100 associated with dynamic multipath beam optimization. As shown in FIGS. 1A-1G, example 100 includes a user device (UD) 105, a base station 110, a RAN 115, and a management system 120. The management system 120 may be associated with the base station 110 and/or the RAN 115 (e.g., the management system 120 may be configured to provide a management functionality for the base station 110 and/or the RAN 115). Further details of the user device 105, the base station 110, the RAN 115, and the management system 120, are provided elsewhere herein.

As shown in FIG. 1A, and by reference number 125, the base station 110 may provide a plurality of beams (e.g., a plurality of downlink beams) for communicating with user devices. In some implementations, as shown by reference number 130, the management system 120 may cause the base station 110 (e.g., by sending one or more commands to the base station 110) to provide a beam set that is to be utilized to communicate with the user device 105. The beam set may include one or more active beams, of the plurality of beams, that are associated with a single beam identifier. Accordingly, the beam set appears, to the user device 105, as a "single" beam associated with the single beam identifier (e.g., because the one or more active beams each communicate the same single beam identifier to the user device 105). In this way, the one or more active beams combine to provide a "multipath beam" to the user device 105.

An individual beam can be obstructed (e.g., by an object, such as a building, trees, and/or foliage, among other examples), which reduces a power (e.g., as measured in decibel-milliwatts (dBm)) of the beam when received by the user device 105. Combining multiple beams (e.g., in the beam set) may allow for constructive combination of the beams (e.g., via free-space path propagation and/or reflected path propagation), which provides an increased power. Accordingly, the user device 105 may select the beam set (e.g., as providing a highest power over any other beam or other beam set of the plurality of beams), such that the beam set is to be utilized to communicate with the user device 105.

As further shown in FIG. 1A, and by reference number 135, the user device 105 may provide information indicating a power measurement (e.g., as measured in dBm) of the beam set to the management system 120. For example, the user device 105 may identify (e.g., using one or more antennas of the user device) the beam set (e.g., that appears, to the user device 105, as a single beam associated with the single beam identifier) and may monitor a power of the beam set to generate the power measurement of the beam set. The user device 105 may provide the information indicating the power measurement of the beam set to the management system 120, and therefore the management system 120 may obtain and process (e.g., read and/or parse) the information indicating the power measurement of the beam set to determine the power measurement of the beam set.

As shown in FIG. 1A, and by reference number 140, the management system 120 may identify a location of the user device 105. For example, the management system 120 and the user device 105 may communicate scheduling traffic (e.g., to allow the base station 110 and/or the RAN 115 to provide wireless communication for the user device 105), and the management system 120 may determine a delay associated with communications from the user device 105. Accordingly, the management system 120 may determine, based on the delay, a distance of the user device from the base station 110 and/or the RAN 115. Additionally, the management system 120 may determine a geographical location (e.g., an area defined by a latitude range and a longitude range) of the user device 105 based on the distance from the base station 110 and/or the RAN 115 and identification of a coverage area of the one or more active beams of the beam set. Additionally, or alternatively, the user device 105 may determine the location of the user device 105 (e.g., a geographical location, using a global positioning system (GPS) component of the user device) and may provide information indicating the location of the user device 105 to the management system 120. The management system 120 may therefore obtain and process (e.g., read and/or parse) the information indicating the location of the user device 105 to identify the location of the user device 105.

As further shown in FIG. 1B, and by reference number 145, the management system 120 may determine an expected power measurement of the beam set (e.g., based on the location of the user device 105). For example, the management system 120 may identify one or more algorithms for determining an expected power of the one or more active beams of the beam set (e.g., a combined power of the one or more active beams) at one or more locations (e.g., based on free-space path propagation of the one or more active beams). The management system 120 may therefore use the one or more algorithms, based on the location of the user device 105, to determine the expected power measurement of the beam set. As another example, the management system 120 may determine a maximum expected power of the one or more active beams (e.g., based on configuration information of the one or more active beams) and may determine the expected power measurement of the beam set as a function of the location of the user device 105 in relation to a location of the base station 110 and/or the RAN 115 (e.g., as a function of a distance of the location of the user device 105 from the location of the base station 110 and/or the RAN 115).

Figure 1C:
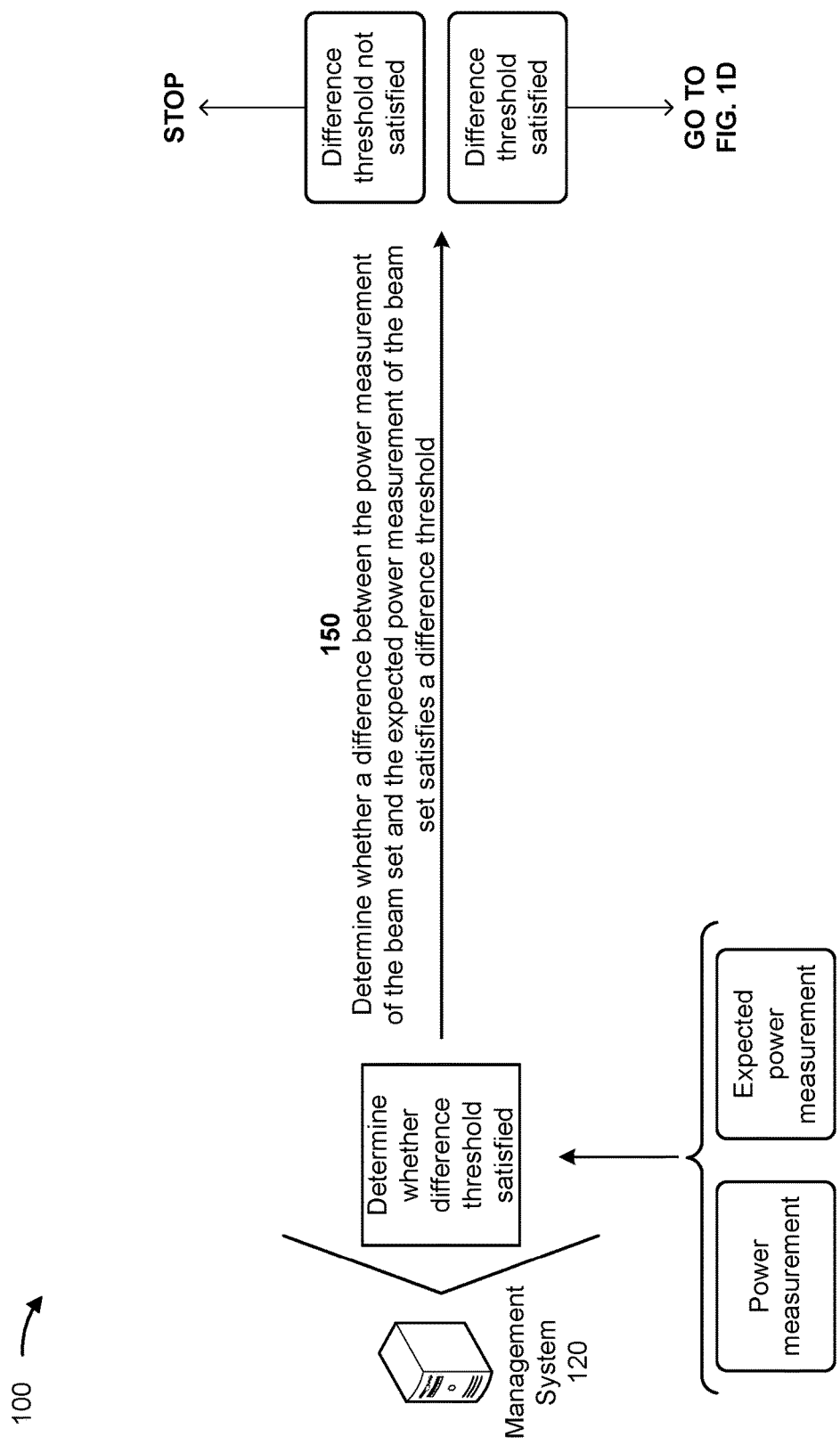

As shown in FIG. 1C, and by reference number 150, the management system 120 may determine whether a difference between the power measurement of the beam set and the expected power measurement of the beam set satisfies a difference threshold (e.g., whether the difference is greater than or equal to the difference threshold). The difference threshold may be less than or equal to a particular power measurement value, such as 1 dBm, 2 dBm, and/or 3 dBm. Alternatively, the difference threshold may less than or equal to a particular percentage of the power measurement or of the expected power measurement. For example, the difference threshold may be less than or equal to 1%, 5%, or 10%, among other examples, of the power measurement or of the expected power measurement. When the management system 120 determines that the difference between the power measurement of the beam set and the expected power measurement of the beam set does not satisfy the difference threshold, the management system 120 may forego performing one or more processing steps described herein in relation to FIGS. 1D-1G (and thereby refrain from causing the beam set to be modified, as described elsewhere herein). When the management system 120 determines that the difference between the power measurement of the beam set and the expected power measurement of the beam set satisfies the difference threshold, the management system 120 may perform one or more processing steps described herein in relation to FIGS. 1D-1G (and thereby cause the beam to be modified, as described elsewhere herein).

Figure 1D:
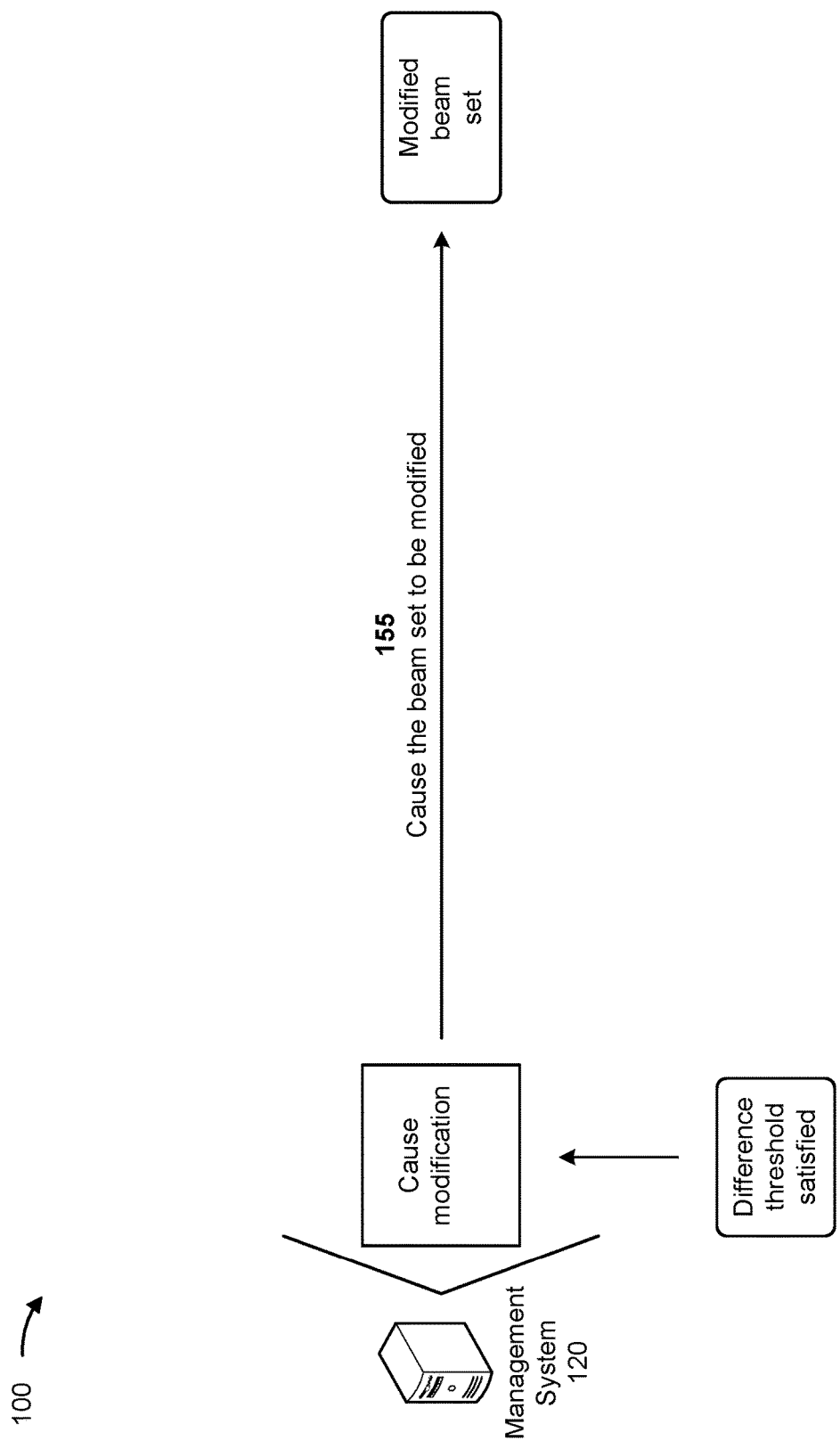

As shown in FIG. 1D, and by reference number 155, the management system 120 may cause (e.g., by sending one or more commands to the base station 110) the beam set to be modified (e.g., based on determining that the difference between the power measurement of the beam set and the expected power measurement of the beam set satisfies the difference threshold). The management system 120 may cause the beam set to be modified by, for example, causing at least one different beam, of the plurality of beams, to be active and to be associated with the single beam identifier (and thereby cause the beam set to include the one or more active beams and the at least one different beam); causing one or more parameters (e.g., a power parameter, a modulation and coding scheme parameter, and/or another parameter) of a first particular active beam, of the one or more active beams included in the beam set, to be modified; and/or causing a second particular active beam, of the one or more active beams included in the beam set, to become inactive (and thereby cause the second particular active beam to be removed from the beam set).

In some implementations, the management system 120 may use a machine learning model (e.g., a neural network machine learning model, or another machine learning model) to identify the at least one different beam to be included in the beam set, identify the first particular active beam and determine one or more particular values for the one or more parameters of the first particular active beam; and/or identify the second particular active beam and determine that the second particular active beam is to be inactivated. For example, the management system 120 may process, using the machine learning model, input information indicating the beam set (e.g., that includes information identifying the one or more active beams of the beam set, one or more respective parameters of the one or more active beams, and/or one or more characteristics of the beam set, among other examples), the power measurement of the beam set, the expected power measurement of the beam set, the location of the user device, and/or the difference between the power measurement of the beam set and the expected power measurement of the beam set, to determine a modification plan (e.g., that identifies the at least one different beam to be included in the beam set, identifies the first particular active beam and determine one or more particular values for the one or more parameters of the first particular active beam, and/or identifies the second particular active beam and determine that the second particular active beam is to be inactivated).

In some implementations, the management system 120 may train the machine learning model based on historical data (e.g., historical input information and historical modification plans) and/or additional information, such as timing information (e.g., that indicates time of day, time of week, time of month, and/or time of year), weather information (e.g., that indicates a weather condition), or other information associated with each data element of the historical data. Using the historical data and/or the additional information as inputs to the machine learning model, the management system 120 may train the machine learning model to determine a particular modification plan for particular input information. In some implementations, the machine learning model may be trained and/or used in a manner similar to that described below with respect to FIG. 2.

Accordingly, as an example, the management system 120 may process input information that indicates the beam set, the power measurement of the beam set, the expected power measurement of the beam set, the location of the user device, the difference between the power measurement of the beam set and the expected power measurement of the beam set, a time of measurement (e.g., a minute, an hour, a day, a week, a month, and/or a year of the power measurement and/or the expected measurement), and/or a weather condition (e.g., a temperature, a humidity, an atmospheric pressure, or another weather condition) at the time of measurement, with the machine learning model, to determine a modification plan that identifies at least one different beam, of the plurality of beams, that is to be included in the beam set. The management system 120 may therefore cause the at least one different beam to be active and to be associated with the single beam identifier (and thereby cause the beam set to include the one or more active beams and the at least one different beam).

As another example, the management system 120 may process the input information, with the machine learning model, to determine a modification plan that identifies a particular active beam, of the one or more active beams included in the beam set, and particular values for one or more parameters of the particular active beam. The management system 120 may therefore cause the one or more parameters of the particular active beam to have the particular values. In an additional example, the management system 120 may process the input information, with the machine learning model, to determine a modification plan that identifies a particular active beam of the one or more active beams included in the beam set and that indicates that the particular active beam is to be inactivated. The management system 120 may therefore cause the particular active beam to become inactive (and no longer part of the beam set).

As shown in FIG. 1E, and by reference number 160, the user device 105 may provide information indicating an updated power measurement of the beam set to the management system 120. For example, the user device 105 may identify the beam set (e.g., after modification of the beam set) and may monitor the power of the beam set to generate the updated power measurement of the beam set (e.g., in a similar manner as that described herein in relation to FIG. 1A and reference number 130). The user device 105 may provide the information indicating the updated power measurement of the beam set to the management system 120, and therefore the management system 120 may obtain and process (e.g., read and/or parse) the information indicating the updated power measurement of the beam set to determine the updated power measurement of the beam set.

As further shown in FIG. 1E, and by reference number 165, the management system 120 may identify an updated location of the user device 105 (e.g., in a similar manner as that described herein in relation to FIG. 1A and reference number 140). For example, the management system 120 and the user device 105 may communicate scheduling traffic and the management system 120 may determine an updated delay associated with communications from the user device 105. Accordingly, the management system 120 may determine, based on the updated delay, an updated distance of the user device 105 from the base station 110 and/or the RAN 115. Additionally, the management system 120 may determine an updated geographical location of the user device 105 based on the updated distance from the base station 110 and/or the RAN 115 and identification of a coverage area of one or more active beams of the beam set (e.g., after modification of the beam set). Additionally, or alternatively, the user device 105 may determine the updated location of the user device 105 (e.g., a geographical location) and may provide information indicating the updated location of the user device 105 to the management system 120. The management system 120 may therefore obtain and process (e.g., read and/or parse) the information indicating the updated location of the user device 105 to identify the updated location of the user device 105.

Figure 1F:
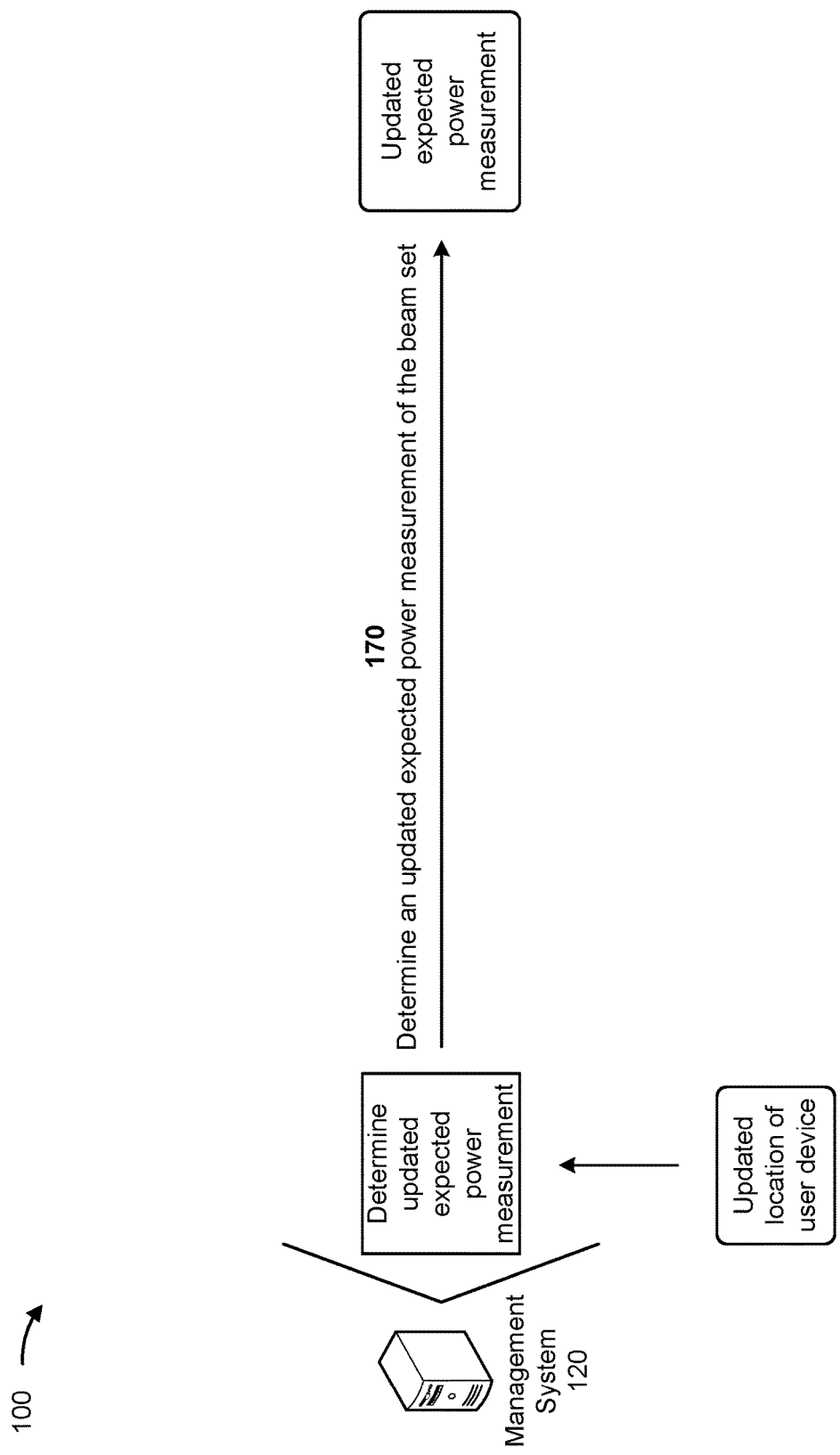

As shown in FIG. 1F, and by reference number 170, the management system 120 may determine (e.g., based on the updated location of the user device 105) an updated expected power measurement of the beam set (e.g., in a similar manner as that described herein in relation to FIG. 1B and reference number 145). For example, the management system 120 may identify the one or more algorithms for determining an expected power of the one or more active beams of the beam set (e.g., a combined power of the one or more active beams of the beam set, after modification of the beam set) at one or more locations. The management system 120 may therefore use the one or more algorithms, based on the updated location of the user device 105, to determine the updated expected power measurement of the beam set. As another example, the management system 120 may determine an updated maximum expected power of the one or more active beams (e.g., based on configuration information of the one or more active beams) and may determine the updated expected power measurement of the beam set as a function of the updated location of the user device 105 in relation to a location of the base station 110 and/or the RAN 115 (e.g., as a function of a distance of the updated location of the user device 105 from the location of the base station 110 and/or the RAN 115).

Figure 1G:
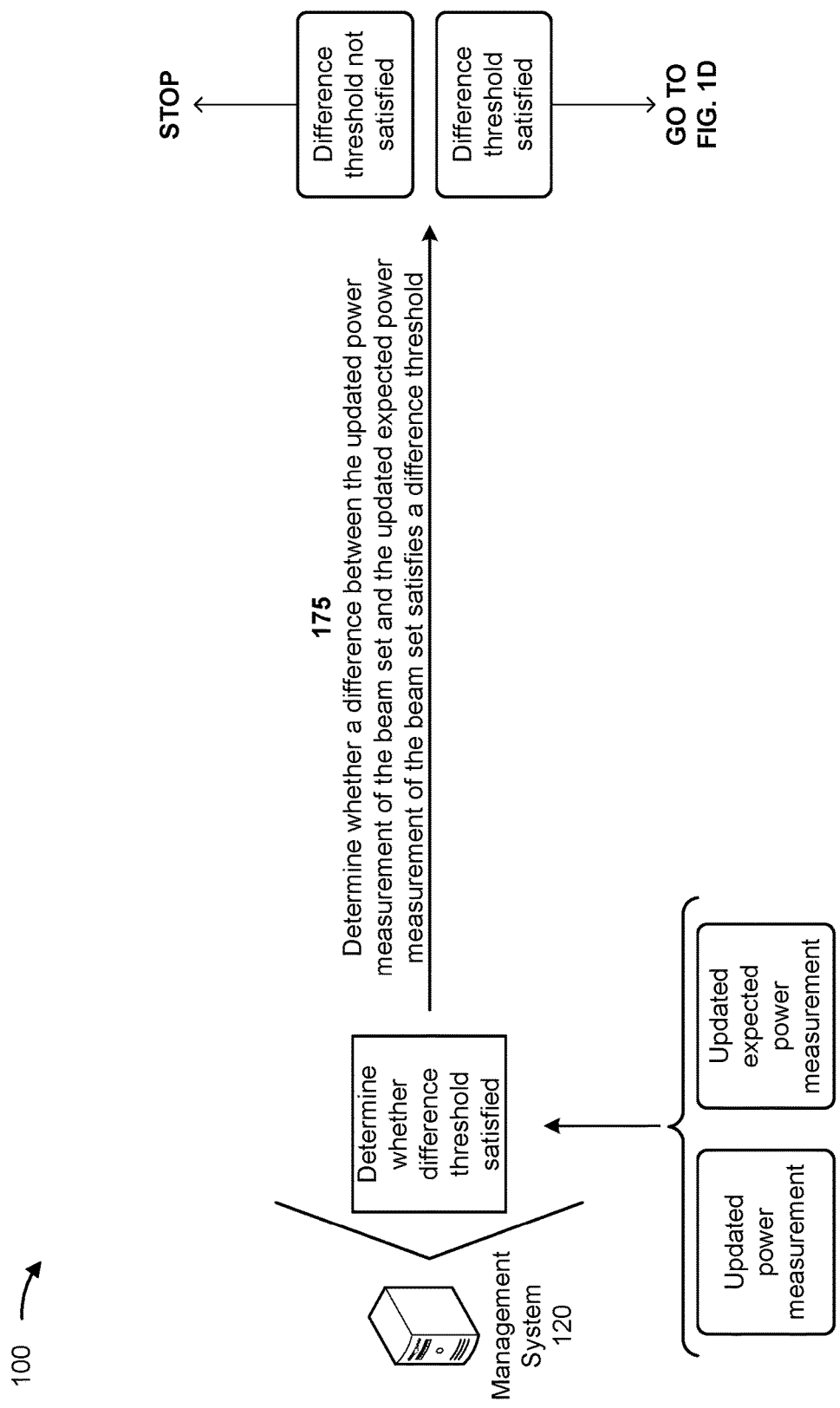

As shown in FIG. 1G, and by reference number 175, the management system 120 may determine whether a difference between the updated power measurement of the beam set and the updated expected power measurement of the beam set satisfies the difference threshold (e.g., described herein in relation to FIG. 1C and reference number 150). The difference threshold may be less than or equal to a particular power measurement value, such as 1 dBm, 2 dBm, and/or 3 dBm. Alternatively, the difference threshold may less than or equal to a particular percentage of the updated power measurement or of the updated expected power measurement. For example, the difference threshold may be less than or equal to 1%, 5%, or 10%, among other examples, of the updated power measurement or of the updated expected power measurement.

When the management system 120 determines that the difference between the updated power measurement of the beam set and the updated expected power measurement of the beam set satisfies the difference threshold, the management system 120 may perform one or more processing steps (e.g., reperform some or all of the processing steps described herein in relation to FIGS. 1D-1G) to cause the beam set to be additionally modified. When the management system 120 determines that the difference between the updated power measurement of the beam set and the updated expected power measurement of the beam set does not satisfy the difference threshold, the management system 120 may forego performing one or more processing steps described above (e.g., forego reperforming the one or more processing steps) and thereby refrains from causing the beam set to be additionally modified. In this way, the management system 120 may continually iterate through a number of processing steps to modify the beam set, and thereby increase a likelihood that the power of the beam set (as received by the user device 105) is optimized (e.g., maximized).

In some implementations, when the management system 120 determines that the difference between the updated power measurement of the beam set and the updated expected power measurement of the beam set does not satisfy the difference threshold, the management system 120 may cause the machine learning model (e.g., that the management system 120 used to facilitate modification of the beam set, as described herein in relation to FIG. 1D and reference number 150) to be updated. For example, the management system 120 may update the machine learning model based on information indicating the beam set prior to modification, the power measurement of the beam set, the expected power measurement of the beam set, the location of the user device, the difference between the power measurement of the beam set and the expected power measurement of the beam set, a time of measurement (of the power measurement and/or the expected power measurement), the weather condition at the time of measurement, the beam set after modification, the updated power measurement of the beam set, the updated expected power measurement of the beam set, the updated location of the user device, the difference between the updated power measurement of the beam set and the updated expected power measurement of the beam set, another time of measurement (e.g., of the updated power measurement and/or the expected power measurement), and/or a weather condition at the other time of measurement. In this way, the management system 120 conserves computing resources (e.g., processing resources, memory resources, communication resources, and/or power resources, among other examples), networking resources, and/or the like that would otherwise have been consumed in generating inaccurate or unoptimized modification plans.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2:
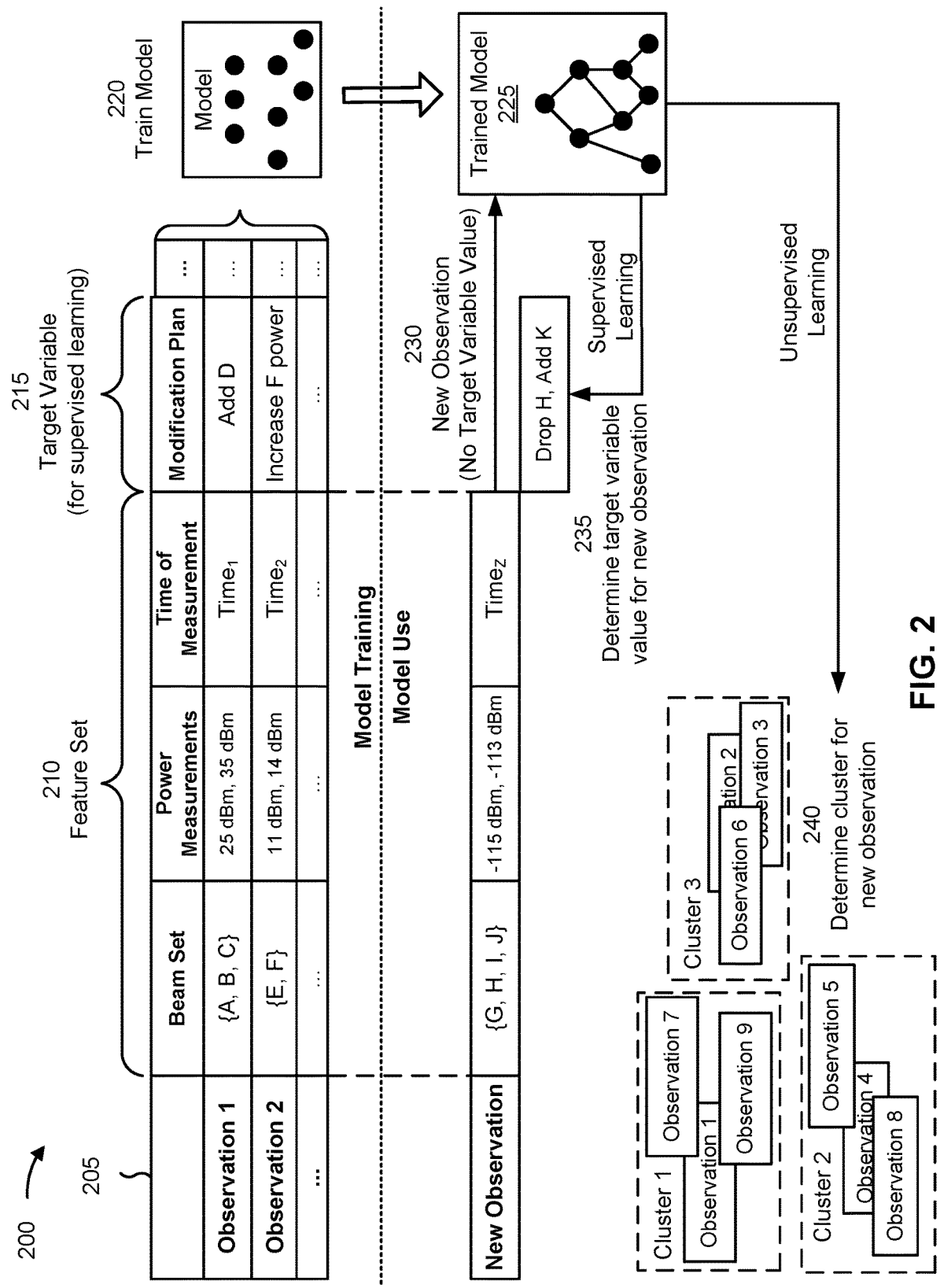
FIG. 2 is a diagram illustrating an example of training and using a machine learning model in connection with example implementations described herein.

FIG. 2 is a diagram illustrating an example 200 of training and using a machine learning model in connection with dynamic beam set optimization. The machine learning model training and usage described herein may be performed using a machine learning system. The machine learning system may include or may be included in a computing device, a server, a cloud computing environment, or the like, such as the management system 120 and/or the base station 110, described in more detail elsewhere herein.

As shown by reference number 205, a machine learning model may be trained using a set of observations. The set of observations may be obtained from training data (e.g., historical data), such as data gathered during one or more processes described herein. In some implementations, the machine learning system may receive the set of observations (e.g., as input) from the management system 120, the user device 105, and/or the base station 110, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the management system 120, the user device 105, and/or the base station 110. For example, the machine learning system may identify a feature set (e.g., one or more features and/or feature values) by extracting the feature set from structured data and/or by receiving input from an operator.

As an example, a feature set for a set of observations may include a first feature of beam set (e.g., that includes information identifying the one or more active beams of the beam set, one or more respective parameters of the one or more active beams, and/or one or more characteristics of the beam set, among other examples), a second feature of power measurements (e.g., that includes information identifying a power measurement of the beam set and an expected power measurement of the beam set), a third feature of time of measurement (a minute, an hour, a day, a week, a month, and/or a year of the power measurement and/or the expected measurement), and so on. As shown, for a first observation, the first feature may have a value of an {A, B, C} beam set, the second feature may have a value of 25 dBm (for a power measurement of the beam set) and 35 dBm (for an expected power measurement of the beam set), the third feature may have a value of $Time_1$, and so on. These features and feature values are provided as examples, and may differ in other examples. For example, the feature set may include one or more of the following features: a location of the user device that is to utilize the beam set, a difference between the power measurement of the beam set and the expected power measurement of the beam set, a weather condition at the time of measurement, among other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 200, the target variable is modification plan, which has a value of "Add D" (e.g., that indicates that a beam D is to be included in the beam set) for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, for the new observation, the first feature may have a value of a {G, H, I, J} beam set, the second feature may have a value of −115 dBm (for a power measurement of the beam set) and −113 dBm (for an expected power measurement of the beam set), the third feature may have a value of $Time_2$, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may predict a value of "Drop H, Add K" (e.g., that indicates that a beam H is to be removed from the beam set, and that a beam K is to be included in the beam set) for the target variable of modification plan for the new observation, as shown by reference number 235. Based on this prediction, the machine learning system may provide a first recommendation, may provide output for determination of a first recommendation, may perform a first automated action, and/or may cause a first automated action to be performed (e.g., by instructing another device to perform the automated action), among other examples. The first recommendation may include, for example, inactivating beam H and/or activating beam K (and associating beam K with a beam identifier of the beam set). The first automated action may include, for example, automatically inactivating beam H and/or automatically activating beam K (and associating beam K with the beam identifier of the beam set).

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., add or drop a beam), then the machine learning system may provide a first recommendation, such as the first recommendation described above. Additionally, or alternatively, the machine learning system may perform a first automated action and/or may cause a first automated action to be performed (e.g., by instructing another device to perform the automated action) based on classifying the new observation in the first cluster, such as the first automated action described above.

As another example, if the machine learning system were to classify the new observation in a second cluster (e.g., modify one or more parameters), then the machine learning system may provide a second (e.g., different) recommendation (e.g., modify one or more parameters of a beam of the beam set) and/or may perform or cause performance of a second (e.g., different) automated action, such as automatically modifying the one or more parameters of the beam of the beam set.

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified.

In some implementations, the trained machine learning model 225 may be re-trained using feedback information. For example, feedback may be provided to the machine learning model. The feedback may be associated with actions performed based on the recommendations provided by the trained machine learning model 225 and/or automated actions performed, or caused, by the trained machine learning model 225. In other words, the recommendations and/or actions output by the trained machine learning model 225 may be used as inputs to re-train the machine learning model (e.g., a feedback loop may be used to train and/or update the machine learning model). For example, the feedback information may include an updated power measurement and/or an updated expected power measurement of the beam set.

In this way, the machine learning system may apply a rigorous and automated process to determining a modification plan for modifying a beam set (e.g., to optimize a power of the beam set). The machine learning system enables recognition and/or identification of tens, hundreds, thousands, or millions of features and/or feature values for tens, hundreds, thousands, or millions of observations, thereby increasing accuracy and consistency and reducing delay associated with determining a modification plan for modifying a beam set relative to requiring computing resources to be allocated for tens, hundreds, or thousands of operators to manually determine a modification plan for modifying a beam set using the features or feature values.

As indicated above, FIG. 2 is provided as an example. Other examples may differ from what is described in connection with FIG. 2.

Figure 3:
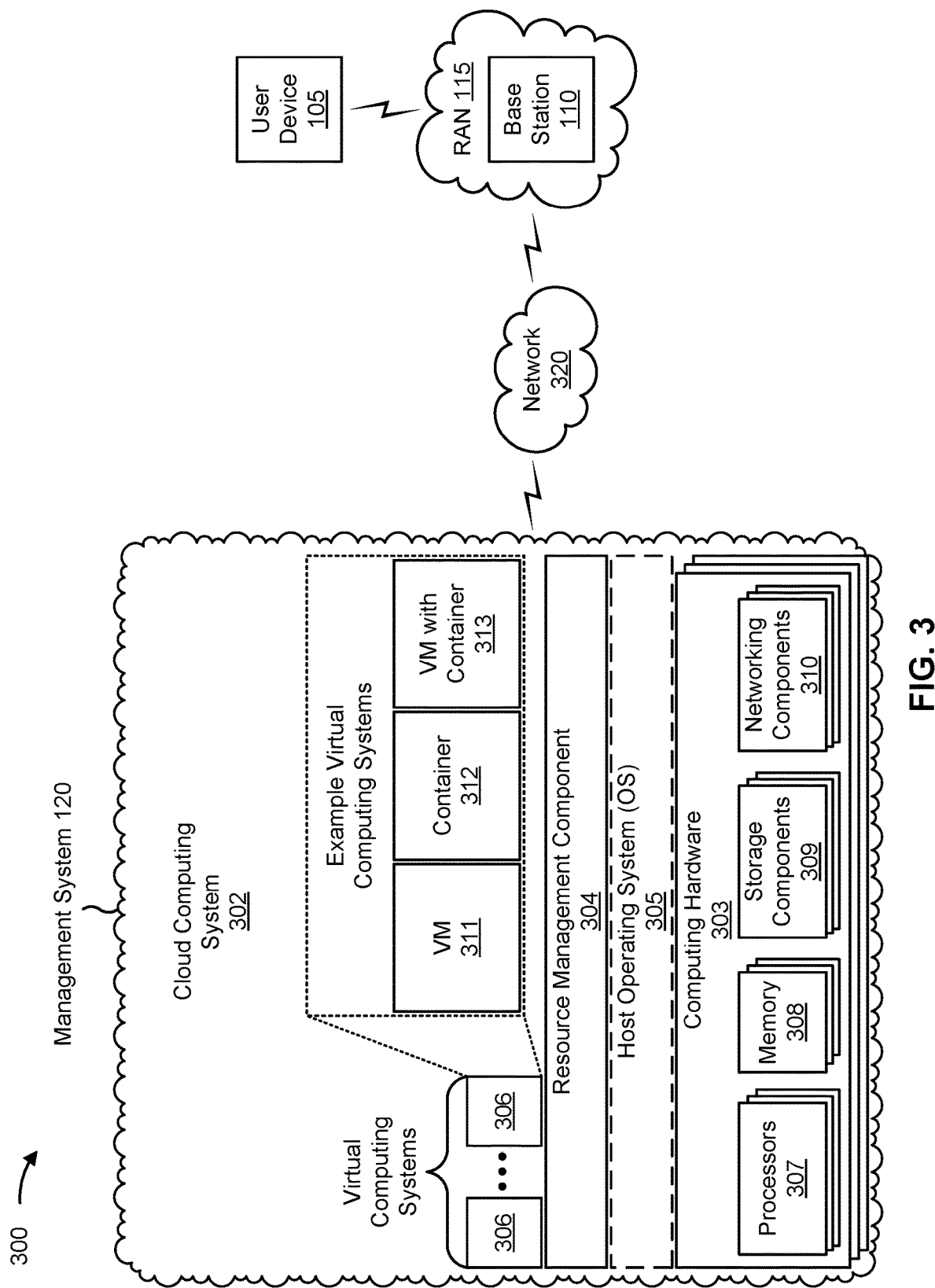
FIG. 3 is a diagram of an example environment in which systems and/or methods described herein may be implemented.

FIG. 3 is a diagram of an example environment 300 in which systems and/or methods described herein may be implemented. As shown in FIG. 3, the environment 300 may include the management system 120, which may include one or more elements of and/or may execute within a cloud computing system 302. The cloud computing system 302 may include one or more elements 303-313, as described in more detail below. As further shown in FIG. 3, the environment 300 may include the user device 105, the base station 110, the RAN 115, and/or a network 320. Devices and/or elements of the environment 300 may interconnect via wired connections and/or wireless connections.

The user device 105 includes one or more devices capable of receiving, generating, storing, processing, and/or providing information, such as information described herein. For example, the user device 105 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, an autonomous vehicle, or a similar type of device.

The base station 110 includes one or more devices capable of transferring traffic, such as audio, video, text, and/or other traffic, destined for and/or received from the user device 105. For example, the base station 110 may include an eNodeB (eNB) associated with a long term evolution (LTE) network that receives traffic from and/or sends traffic to a core network, a gNodeB (gNB) associated with a RAN of a 5G network, a base transceiver station, a radio base station, a base station subsystem, a cellular site, a cellular tower, an access point, a transmit receive point (TRP), a radio access node, a macrocell base station, a microcell base station, a picocell base station, a femtocell base station, and/or another network entity capable of supporting wireless communication. The base station 110 may support, for example, a cellular radio access technology (RAT). In some implementations, the base station 110 may employ one or more short-range wireless communication protocols for a wireless personal area network (WPAN) and/or a wireless local area network (WLAN), such as, for example, IEEE 802.15 (e.g., Bluetooth) and IEEE 802.11 (e.g., Wi-Fi).

The base station 110 may transfer traffic between the user device 105 (e.g., using a cellular RAT), one or more other base stations 110 (e.g., using a wireless interface or a backhaul interface, such as a wired backhaul interface), and/or a core network. The base station 110 may provide one or more cells that cover geographic areas. In some implementations, the base station may provide a plurality of beams to cover the geographic areas, wherein a beam set may include one or more active beams that are associated with a single beam identifier.

In some implementations, the term "base station" (e.g., the base station 110) or "network node" or "network entity" may refer to an aggregated base station, a disaggregated base station, an integrated access and backhaul (IAB) node, a relay node, and/or one or more components thereof. For example, in some implementations, "base station," "network node," or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some implementations, the term "base station," "network node," or "network entity" may refer to one device configured to perform one or more functions, such as those described herein in connection with the base station 110. In some implementations, the term "base station," "network node," or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station," "network node," or "network entity" may refer to any one or more of those different devices. In some implementations, the term "base station," "network node," or "network entity" may refer to one or more virtual base stations and/or one or more virtual base station functions. For example, in some implementations, two or more base station functions may be instantiated on a single device. In some aspects, the term "base station," "network node," or "network entity" may refer to one of the base station functions and not another. In this way, a single device may include more than one base station.

The RAN 115 may support, for example, the RAT and may include one or more base stations 110 and other network entities that can support wireless communication for the user device 105. In some implementations, the RAN 115 may perform scheduling and/or resource management for the user device 105 covered by the RAN 115 (e.g., the user device 105 covered by a cell provided by a base station 110 of the RAN 115). In some implementations, the RAN 115 may be controlled or coordinated by a network controller, which may perform load balancing, network-level configuration, and/or other operations. The network controller may communicate with the RAN 115 via a wireless or wireline backhaul. In some implementations, the RAN 115 may include a network controller, a self-organizing network (SON) module or component, or a similar module or component. In other words, the RAN 115 may perform network control, scheduling, and/or network management functions (e.g., for uplink, downlink, and/or sidelink communications of the user device 105 covered by the RAN 115).

The cloud computing system 302 includes computing hardware 303, a resource management component 304, a host operating system (OS) 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of the computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from the computing hardware 303 of the single computing device. In this way, the computing hardware 303 can operate more efficiently, with lower power consumption, higher reliability, higher availability, higher utilization, greater flexibility, and lower cost than using separate computing devices.

The computing hardware 303 includes hardware and corresponding resources from one or more computing devices. For example, the computing hardware 303 may include hardware from a single computing device (e.g., a single server) or from multiple computing devices (e.g., multiple servers), such as multiple computing devices in one or more data centers. As shown, the computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as the computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 3 hypervisor, or another type of hypervisor) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using the computing hardware 303. As shown, the virtual computing system 306 may include a virtual machine 311, a container 312, or a hybrid environment 313 that includes a virtual machine and a container, among other examples. The virtual computing system 306 may execute one or more applications using a file system that includes binary files, software libraries, and/or other resources required to execute applications on a guest operating system (e.g., within the virtual computing system 306) or the host operating system 305.

Although the management system 120 may include one or more elements 303-213 of the cloud computing system 302, may execute within the cloud computing system 302, and/or may be hosted within the cloud computing system 302, in some implementations, the management system 120 may not be cloud-based (e.g., may be implemented outside of a cloud computing system) or may be partially cloud-based. For example, the management system 120 may include one or more devices that are not part of the cloud computing system 302, such as the device 400 of FIG. 4, which may include a standalone server or another type of computing device. The management system 120 may perform one or more operations and/or processes described in more detail elsewhere herein.

The network 320 includes one or more wired and/or wireless networks. For example, the network 320 may include a cellular network, a public land mobile network (PLMN), a local area network (LAN), a wide area network (WAN), a private network, the Internet, and/or a combination of these or other types of networks. The network 320 enables communication among the devices of the environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
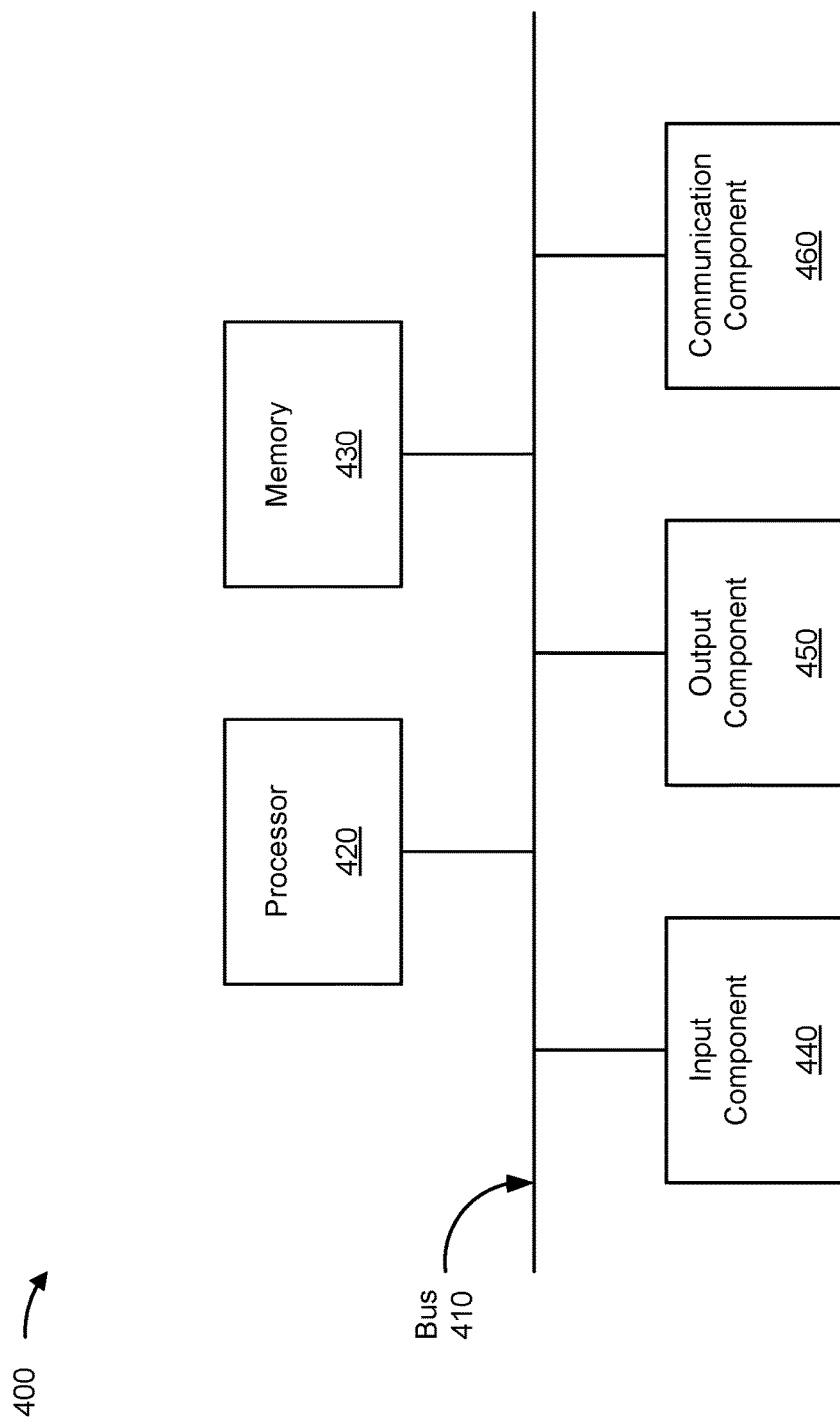
FIG. 4 is a diagram of example components of one or more devices of FIG. 3.

FIG. 4 is a diagram of example components of a device 400, which may correspond to the user device 105, the base station 110, the management system 120, and/or the computing hardware 303. In some implementations, the user device 105, the base station 110, the management system 120, and/or the computing hardware 303 include one or more devices 400 and/or one or more components of device 400. As shown in FIG. 4, device 400 may include a bus 410, a processor 420, a memory 430, an input component 440, an output component 450, and a communication component 460.

Bus 410 includes one or more components that enable wired and/or wireless communication among the components of device 400. Bus 410 may couple together two or more components of FIG. 4, such as via operative coupling, communicative coupling, electronic coupling, and/or electric coupling. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform one or more operations or processes described elsewhere herein.

Memory 430 includes volatile and/or nonvolatile memory. For example, memory 430 may include random access memory (RAM), read only memory (ROM), a hard disk drive, and/or another type of memory (e.g., a flash memory, a magnetic memory, and/or an optical memory). Memory 430 may include internal memory (e.g., RAM, ROM, or a hard disk drive) and/or removable memory (e.g., removable via a universal serial bus connection). Memory 430 may be a non-transitory computer-readable medium. Memory 430 stores information, instructions, and/or software (e.g., one or more software applications) related to the operation of device 400. In some implementations, memory 430 includes one or more memories that are coupled to one or more processors (e.g., processor 420), such as via bus 410.

Input component 440 enables device 400 to receive input, such as user input and/or sensed input. For example, input component 440 may include a touch screen, a keyboard, a keypad, a mouse, a button, a microphone, a switch, a sensor, a global positioning system sensor, an accelerometer, a gyroscope, and/or an actuator. Output component 450 enables device 400 to provide output, such as via a display, a speaker, and/or a light-emitting diode. Communication component 460 enables device 400 to communicate with other devices via a wired connection and/or a wireless connection. For example, communication component 460 may include a receiver, a transmitter, a transceiver, a modem, a network interface card, and/or an antenna.

Device 400 may perform one or more operations or processes described herein. For example, a non-transitory computer-readable medium (e.g., memory 430) may store a set of instructions (e.g., one or more instructions or code) for execution by processor 420. Processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry is used instead of or in combination with the instructions to perform one or more operations or processes described herein. Additionally, or alternatively, processor 420 may be configured to perform one or more operations or processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
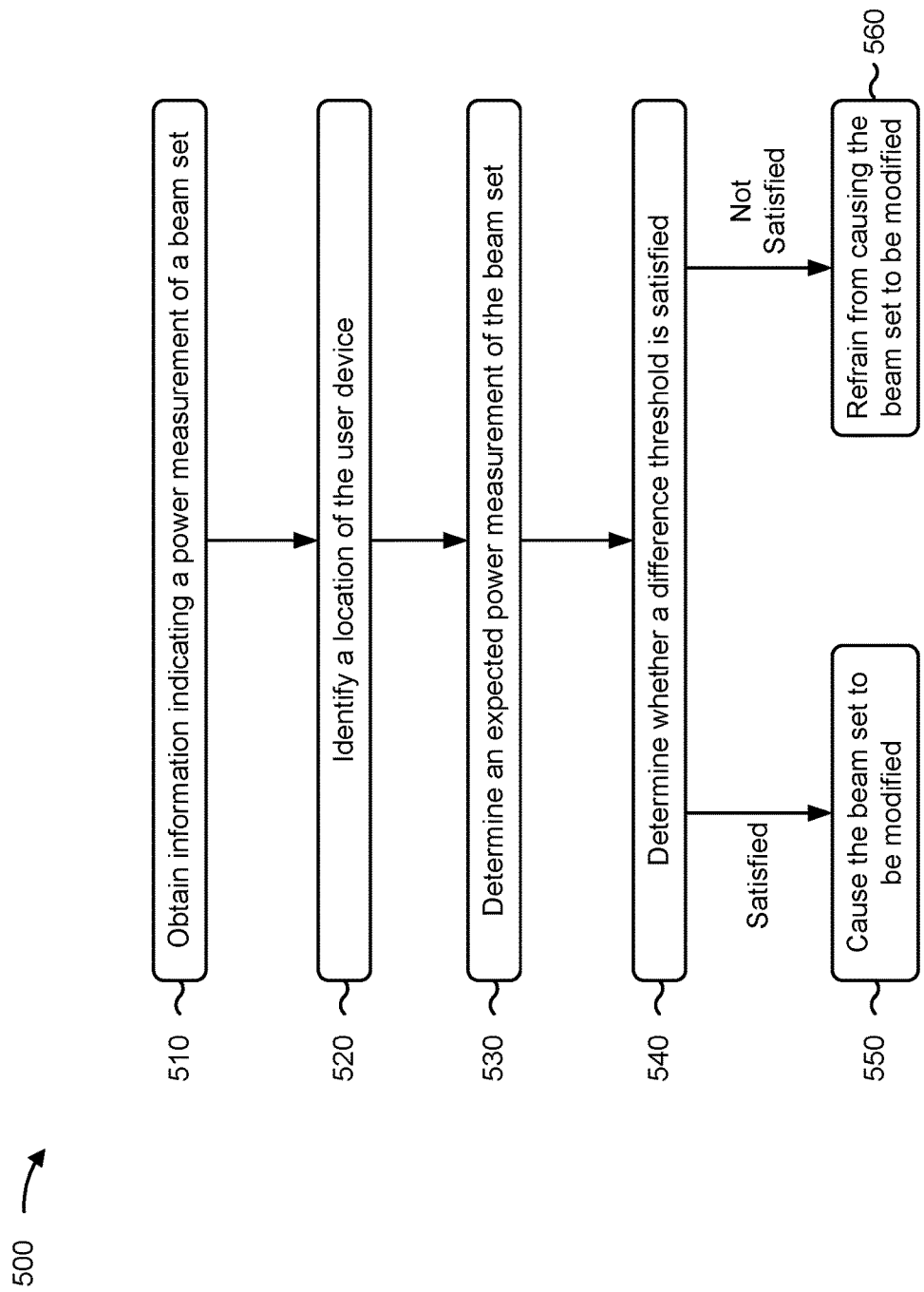
FIG. 5 is a flowchart of an example process relating to dynamic beam set optimization.

FIG. 5 is a flowchart of an example process 500 relating to dynamic beam set optimization. In some implementations, one or more process blocks of FIG. 5 may be performed by a device (e.g., the management system 120). In some implementations, one or more process blocks of FIG. 5 may be performed by another device or a group of devices separate from or including the device, such as a base station (e.g., the base station 110). Additionally, or alternatively, one or more process blocks of FIG. 5 may be performed by one or more components of the device 400, such as the processor 420, the memory 430, the input component 440, the output component 450, and/or the communication component 460.

As shown in FIG. 5, process 500 may include obtaining information indicating a power measurement of a beam set (block 510). For example, the device may obtain, from a user device, information indicating a power measurement of a beam set that is utilized to communicate with the user device, as described above. In some implementations, the beam set includes one or more active beams, of a plurality of beams, that are associated with a single beam identifier.

As further shown in FIG. 5, process 500 may include identifying a location of the user device (block 520). For example, the device may identify a location of the user device, as described above.

As further shown in FIG. 5, process 500 may include determining an expected power measurement of the beam set (block 530). For example, the device may determine, based on the location of the user device, an expected power measurement of the beam set, as described above.

As further shown in FIG. 5, process 500 may include determining whether a difference threshold is satisfied (block 540). For example, the device may determine whether a difference between the power measurement of the beam set and the expected power measurement of the beam set satisfies a difference threshold, as described above.

As further shown in FIG. 5, process 500 may include causing the beam set to be modified (block 550). For example, the device may cause, based on determining that the difference between the power measurement of the beam set and the expected power measurement of the beam set satisfies the difference threshold, the beam set to be modified, as described above. In some implementations, the device may use a machine learning model to cause the beam set to be modified.

In some implementations, causing the beam set to be modified comprises processing information indicating the beam set, the power measurement of the beam set, the expected power measurement of the beam set, the location of the user device, or the difference between the power measurement of the beam set and the expected power measurement of the beam set, with the machine learning model, to identify at least one different beam, of the plurality of beams, that is to be included in the beam set, and causing the at least one different beam to be active and to be associated with the single beam identifier, wherein causing the at least one different beam to be active and to be associated with the single beam identifier causes the beam set to include the one or more active beams and the at least one different beam.

In some implementations, causing the beam set to be modified comprises processing information indicating the beam set, the power measurement of the beam set, the expected power measurement of the beam set, the location of the user device, or the difference between the power measurement of the beam set and the expected power measurement of the beam set, with the machine learning model, to identifying a particular active beam of the one or more active beams included in the beam set, and determining particular values for one or more parameters of the particular active beam, and causing, based on identifying the particular active beam and determining the particular values for the one or more parameters of the particular active beam, the one or more parameters of the particular active beam to have the particular values.

In some implementations, causing the beam set to be modified comprises processing information indicating the beam set, the power measurement of the beam set, the expected power measurement of the beam set, the location of the user device, or the difference between the power measurement of the beam set and the expected power measurement of the beam set, with the machine learning model, to identifying a particular active beam of the one or more active beams included in the beam set, and determining that the particular active beam is to be inactivated, and causing, based on identifying the particular active beam and determining that the particular active beam is to be inactivated, the particular active beam to be inactive and no longer part of the beam set.

As further shown in FIG. 5, process 500 may include refraining from causing the beam set to be modified (block 560). For example, the device may refrain, based on determining that the difference between the power measurement of the beam set and the expected power measurement of the beam set does not satisfy the difference threshold, from causing the beam set to be modified, as described above.

In some implementations, process 500 includes obtaining, from the user device and based on causing the beam set to be modified, information indicating an updated power measurement of the beam set, identifying an updated location of the user device, determining, based on the updated location of the user device, an updated expected power measurement of the beam set, determining a difference between the updated power measurement of the beam set and the updated expected power measurement of the beam set, and causing, based on the difference between the updated power measurement of the beam set and the updated expected power measurement of the beam set, one or more actions to be performed.

In some implementations, causing the one or more actions to be performed comprises determining that the difference between the updated power measurement of the beam set and the updated expected power measurement of the beam set satisfies the difference threshold, and causing, using the machine learning model and based on determining that the difference between the updated power measurement of the beam set and the updated expected power measurement of the beam set satisfies the difference threshold, the beam set to be additionally modified.

In some implementations, causing the one or more actions to be performed comprises determining that the difference between the updated power measurement of the beam set and the updated expected power measurement of the beam set does not satisfy the difference threshold, and refraining, based on determining that the difference between the updated power measurement of the beam set and the updated expected power measurement of the beam set does not satisfy the difference threshold, from causing the beam set to be additionally modified.

In some implementations, causing the one or more actions to be performed comprises determining that the difference between the updated power measurement of the beam set and the updated expected power measurement of the beam set does not satisfy the difference threshold, and causing, based on determining that the difference between the updated power measurement of the beam set and the updated expected power measurement of the beam set does not satisfy the difference threshold, the machine learning model to be updated based on information indicating at least one of the beam set prior to modification, the power measurement of the beam set, the expected power measurement of the beam set, the location of the user device, the difference between the power measurement of the beam set and the expected power measurement of the beam set, the beam set after modification, the updated power measurement of the beam set, the updated expected power measurement of the beam set, the updated location of the user device, or the difference between the updated power measurement of the beam set and the updated expected power measurement of the beam set.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
    obtaining, by a device and from a user device, information indicating a power measurement of a beam set that is utilized to communicate with the user device,
        wherein the beam set includes one or more active beams, of a plurality of beams, that are associated with a single beam identifier;
    identifying, by the device, a location of the user device;
    determining, by the device and based on the location of the user device, an expected power measurement of the beam set;
    determining, by the device, that a difference between the power measurement of the beam set and the expected power measurement of the beam set satisfies a difference threshold; and
    causing, by the device, based on determining that the difference between the power measurement of the beam set and the expected power measurement of the beam set satisfies the difference threshold, and using a machine learning model, the beam set to be modified.

2. The method of claim 1, wherein causing the beam set to be modified comprises:
    processing information indicating the beam set, the power measurement of the beam set, the expected power measurement of the beam set, the location of the user device, or the difference between the power measurement of the beam set and the expected power measurement of the beam set, with the machine learning model, to identify at least one different beam, of the plurality of beams, that is to be included in the beam set; and
    causing the at least one different beam to be active and to be associated with the single beam identifier,
        wherein causing the at least one different beam to be active and to be associated with the single beam identifier causes the beam set to include the one or more active beams and the at least one different beam.

3. The method of claim 1, wherein causing the beam set to be modified comprises:
    processing information indicating the beam set, the power measurement of the beam set, the expected power measurement of the beam set, the location of the user device, or the difference between the power measurement of the beam set and the expected power measurement of the beam set, with the machine learning model, to:
        identify a particular active beam of the one or more active beams included in the beam set, and
        determine particular values for one or more parameters of the particular active beam; and
    causing, based on identifying the particular active beam and determining the particular values for the one or more parameters of the particular active beam, the one or more parameters of the particular active beam to have the particular values.

4. The method of claim 1, wherein causing the beam set to be modified comprises:
    processing information indicating the beam set, the power measurement of the beam set, the expected power measurement of the beam set, the location of the user device, or the difference between the power measurement of the beam set and the expected power measurement of the beam set, with the machine learning model, to:
        identify a particular active beam of the one or more active beams included in the beam set, and
        determine that the particular active beam is to be inactivated; and
    causing, based on identifying the particular active beam and determining that the particular active beam is to be inactivated, the particular active beam to be inactive and no longer part of the beam set.

5. The method of claim 1, further comprising:
obtaining, from the user device and based on causing the beam set to be modified, information indicating an updated power measurement of the beam set;
identifying an updated location of the user device;
determining, based on the updated location of the user device, an updated expected power measurement of the beam set;
determining a difference between the updated power measurement of the beam set and the updated expected power measurement of the beam set; and
causing, based on the difference between the updated power measurement of the beam set and the updated expected power measurement of the beam set, one or more actions to be performed.

6. The method of claim 5, wherein causing the one or more actions to be performed comprises:
determining that the difference between the updated power measurement of the beam set and the updated expected power measurement of the beam set satisfies the difference threshold; and
causing, using the machine learning model and based on determining that the difference between the updated power measurement of the beam set and the updated expected power measurement of the beam set satisfies the difference threshold, the beam set to be additionally modified.

7. The method of claim 5, wherein causing the one or more actions to be performed comprises:
determining that the difference between the updated power measurement of the beam set and the updated expected power measurement of the beam set does not satisfy the difference threshold; and
refraining, based on determining that the difference between the updated power measurement of the beam set and the updated expected power measurement of the beam set does not satisfy the difference threshold, from causing the beam set to be additionally modified.

8. The method of claim 5, wherein causing the one or more actions to be performed comprises:
determining that the difference between the updated power measurement of the beam set and the updated expected power measurement of the beam set does not satisfy the difference threshold; and
causing, based on determining that the difference between the updated power measurement of the beam set and the updated expected power measurement of the beam set does not satisfy the difference threshold, the machine learning model to be updated based on information indicating at least one of:
the beam set prior to modification,
the power measurement of the beam set,
the expected power measurement of the beam set,
the location of the user device,
the difference between the power measurement of the beam set and the expected power measurement of the beam set,
the beam set after modification,
the updated power measurement of the beam set,
the updated expected power measurement of the beam set,
the updated location of the user device, or
the difference between the updated power measurement of the beam set and the updated expected power measurement of the beam set.

9. A device, comprising:
one or more processors configured to:
obtain, from a user device, information indicating a power measurement of a beam set that is utilized to communicate with the user device,
wherein the beam set includes one or more active beams, of a plurality of beams, that are associated with a single beam identifier;
identify a location of the user device;
determine, based on the location of the user device, an expected power measurement of the beam set;
determine that a difference between the power measurement of the beam set and the expected power measurement of the beam set satisfies a difference threshold; and
cause, based on determining that the difference between the power measurement of the beam set and the expected power measurement of the beam set satisfies the difference threshold, the beam set to be modified.

10. The device of claim 9, wherein the one or more processors, to cause the beam set to be modified, are configured to:
cause at least one different beam, of the plurality of beams, to be active and to be associated with the single beam identifier,
wherein causing the at least one different beam to be active and to be associated with the single beam identifier causes the beam set to include the one or more active beams and the at least one different beam.

11. The device of claim 9, wherein the one or more processors, to cause the beam set to be modified, are configured to:
cause one or more parameters of a particular active beam, of the one or more active beams included in the beam set, to be modified.

12. The device of claim 9, wherein the one or more processors, to cause the beam set to be modified, are configured to:
cause a particular active beam, of the one or more active beams included in the beam set, to become inactive and no longer part of the beam set.

13. The device of claim 9, wherein the one or more processors are further configured to:
obtain, from the user device and based on causing the beam set to be modified, information indicating an updated power measurement of the beam set;
identify an updated location of the user device;
determine, based on the updated location of the user device, an updated expected power measurement of the beam set;
determine a difference between the updated power measurement of the beam set and the updated expected power measurement of the beam set; and
cause, based on the difference between the updated power measurement of the beam set and the updated expected power measurement of the beam set, one or more actions to be performed.

14. The device of claim 13, wherein the one or more processors, to cause the one or more actions to be performed, are configured to:
determine that the difference between the updated power measurement of the beam set and the updated expected power measurement of the beam set satisfies the difference threshold; and cause, based on determining that the difference between the updated power measurement of the beam set and the updated expected power measurement of the beam set satisfies the difference threshold, the beam set to be additionally modified.

15. The device of claim 13, wherein the one or more processors, to cause the one or more actions to be performed, are configured to:
determine that the difference between the updated power measurement of the beam set and the updated expected power measurement of the beam set does not satisfy the difference threshold; and
refrain, based on determining that the difference between the updated power measurement of the beam set and the updated expected power measurement of the beam set does not satisfy the difference threshold, from causing the beam set to be additionally modified.

16. A non-transitory computer-readable medium storing a set of instructions, the set of instructions comprising:
one or more instructions that, when executed by one or more processors of a device, cause the device to:
obtain, from a user device, information indicating a power measurement of a beam set that is utilized to communicate with the user device,
wherein the beam set includes one or more active beams, of a plurality of beams, that are associated with a single beam identifier;
determine an expected power measurement of the beam set;
determine that a difference between the power measurement of the beam set and the expected power measurement of the beam set satisfies a difference threshold; and
cause, based on determining that the difference between the power measurement of the beam set and the expected power measurement of the beam set satisfies the difference threshold, the beam set to be modified to improve network coverage and beam reception at the user device.

17. The non-transitory computer-readable medium of claim 16, wherein the one or more instructions, that cause the device to cause the beam set to be modified, cause the device to at least one of:
cause at least one different beam, of the plurality of beams, to be active and to be associated with the single beam identifier,
wherein causing the at least one different beam to be active and to be associated with the single beam identifier causes the beam set to include the one or more active beams and the at least one different beam; and
cause one or more parameters of a first particular active beam, of the one or more active beams included in the beam set, to be modified; or
cause a second particular active beam, of the one or more active beams included in the beam set, to become inactive and no longer part of the beam set.

18. The non-transitory computer-readable medium of claim 17, wherein the device uses a machine learning model to at least one of:
identify the at least one different beam that is to be included in the beam set;
identify the first particular active beam and determine one or more particular values for the one or more parameters of the first particular active beam; or
identify the second particular active beam and determine that the second particular active beam is to be inactivated.

19. The non-transitory computer-readable medium of claim 16, wherein the one or more instructions, when executed by the one or more processors, further cause the device to:
obtain, from the user device and based on causing the beam set to be modified, information indicating an updated power measurement of the beam set;
determine an updated expected power measurement of the beam set;
determine a difference between the updated power measurement of the beam set and the updated expected power measurement of the beam set; and
cause, based on the difference between the updated power measurement of the beam set and the updated expected power measurement of the beam set, one or more actions to be performed.

20. The non-transitory computer-readable medium of claim 19, wherein the one or more actions include at least one of:
cause the beam set to be additionally modified;
refrain from causing the beam set to be additionally modified; or
cause a machine learning model, that the device used to facilitate modification of the beam set, to be updated.

* * * * *